United States Patent
Rimmington

(10) Patent No.: US 10,138,728 B2
(45) Date of Patent: *Nov. 27, 2018

(54) CONTROLLING AN OUTPUT OF A MINING SYSTEM

(71) Applicant: Joy MM Delaware, Inc., Wilmington, DE (US)

(72) Inventor: Gareth Rimmington, Barnsley (GB)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,148

(22) Filed: Oct. 9, 2017

(65) Prior Publication Data
US 2018/0030830 A1   Feb. 1, 2018

Related U.S. Application Data

(63) Continuation of application No. 14/725,573, filed on May 29, 2015, now Pat. No. 9,810,065.

(51) Int. Cl.
*E21C 35/24* (2006.01)
*E21C 35/12* (2006.01)
(Continued)

(52) U.S. Cl.
CPC .............. *E21C 35/24* (2013.01); *E21C 25/06* (2013.01); *E21C 27/02* (2013.01); *E21C 35/12* (2013.01);
(Continued)

(58) Field of Classification Search
CPC .......... E21C 29/02; E21C 35/12; E21C 35/24; E21C 35/08; E21F 13/06; E21F 13/066; E21D 9/003
See application file for complete search history.

(56) References Cited

U.S. PATENT DOCUMENTS 3,988,578 A   10/1976 Weber
4,466,667 A   8/1984 Poulsen et al.
(Continued)

FOREIGN PATENT DOCUMENTS

DE   4021302    1/1992
DE   19537386   4/1997
(Continued)

OTHER PUBLICATIONS

Search Report from the United Kingdom Intellectual Property Office for Application No. GB1609107.6 dated Dec. 8, 2016 (3 pages).

(Continued)

*Primary Examiner* — David J Bagnell
*Assistant Examiner* — Michael A Goodwin
(74) *Attorney, Agent, or Firm* — Michael Best & Friedrich LLP

(57) ABSTRACT

Controlling an output of a mining system. The control includes receiving, at a processor, a first signal associated with a position of the shearer, determining, using the processor, the position of the shearer based on the first signal, receiving, at the processor, a second signal associated with a load of a conveyor, and determining, using the processor, the load of the conveyor based on the second signal. The method further includes determining, using the processor, an output of the mining system based on the position of the shearer and the load of the conveyor and controlling a speed of the shearer based on the output of the mining system.

22 Claims, 8 Drawing Sheets

(51) Int. Cl.
   *E21F 13/06* (2006.01)
   *E21C 27/02* (2006.01)
   *E21C 25/06* (2006.01)
   *E21C 41/16* (2006.01)
   *E21F 13/00* (2006.01)
   *G05B 15/02* (2006.01)

(52) U.S. Cl.
   CPC .............. *E21C 41/16* (2013.01); *E21F 13/00* (2013.01); *E21F 13/06* (2013.01); *G05B 15/02* (2013.01)

(56) References Cited

U.S. PATENT DOCUMENTS

| | | |
|---|---|---|
| 4,822,105 A | 4/1989 | Yamada et al. |
| 4,898,428 A | 2/1990 | Weber |
| 5,020,860 A | 6/1991 | Bessinger et al. |
| 5,402,879 A | 4/1995 | Briehl |
| 5,441,144 A | 8/1995 | Barnett |
| 5,647,640 A | 7/1997 | Heintzmann et al. |
| 6,029,799 A | 2/2000 | Weigel et al. |
| 8,636,140 B2 | 1/2014 | Tout et al. |
| 8,931,628 B2 | 1/2015 | Hill |
| 2003/0122082 A1 | 7/2003 | Frederick et al. |
| 2011/0254346 A1 | 10/2011 | Neilson et al. |
| 2013/0068594 A1 | 3/2013 | Worthington et al. |
| 2014/0203621 A1 | 7/2014 | Saikia |
| 2014/0330430 A1 | 11/2014 | Waller et al. |
| 2016/0061031 A1 | 3/2016 | Ley et al. |

FOREIGN PATENT DOCUMENTS

| | | |
|---|---|---|
| GB | 2493102 | 1/2013 |
| PL | 398665 | 10/2012 |
| SU | 1546359 | 2/1990 |

OTHER PUBLICATIONS

Search Report from the Polish Patent Office for Application No. P-417320 dated Nov. 22, 2016 (2 pages).

CONTROLLING AN OUTPUT OF A MINING SYSTEM

RELATED APPLICATIONS

This application is a continuation of U.S. patent application Ser. No. 14/725,573, filed May 29, 2015, the entire content of which is hereby incorporated by references.

BACKGROUND

This invention relates to the control of a longwall mining system. The longwall mining system includes a longwall shearer and a conveyor, such as an armored face conveyor ("AFC") or a beam stage loader ("BSL").

SUMMARY

Longwall mining systems for underground mining include, for example, a shearer to remove a mined material (e.g., coal) from a mining face and a conveyor, such as an AFC or BSL, to transport the mined material from an area where the material is being mined to an area for processing (e.g., crushing, storage, etc.). The shearer is driven by one or more drive mechanisms (e.g., motors) to change its position along the mining face and remove the mined material from the mining face. AFCs include, for example, a first sprocket and a second sprocket around which a chain is provided. The chain is driven by one or more drive mechanisms (e.g., a maingate motor, a tailgate motor, etc.), and the movement of the chain around the sprockets causes the conveyor to transport the mined material.

As a shearer moves along the AFC and material is removed from a mining face, it is possible that the AFC is operating in an under-loaded condition. For example, when there is a relatively small amount of mined material on the AFC (i.e., compared to a maximum load of the AFC), the mining system may have available capacity. If, upon identifying that the mining system is not operating at full capacity, the performance of the mining system is increased, the mining system can take up the available capacity and remove more material from the mine. The performance of the mine can be increased, for example, by increasing a speed of the shearer and/or a speed of the conveyor. Similarly, if the mining system is operating at above full capacity, the performance of the mining system can be decreased to prevent damage to the mining system.

This invention relates to using a controller to control a speed of a shearer and/or a conveyor of a longwall mining system to regulate the output of the mining system. The controller receives signals related to a position of the shearer and/or a load of the conveyor and determines an output of the mining system. The controller can modify or adjust (i.e., increase or decrease) the speed of the shearer and/or the conveyor based on the output of the mining system in order to improve the productivity of the mining system. For example, increasing the speed of the shearer causes more mined material to be removed from the mining face, and increasing the speed of the conveyor causes mined material to be transported to the area for processing more quickly.

In one embodiment, the invention provides a mining system. The mining system includes a shearer, a conveyor, a first drive mechanism coupled to the shearer, a first sensor, a second sensor, and a controller. The first drive mechanism is operable to drive the shearer. The first sensor is operable to generate a first signal related to a position of the shearer. The second sensor is operable to generate a second signal related to a load of the conveyor. The controller is operable to receive the first signal from the first sensor, determine the position of the shearer based on the first signal, receive the second signal from the second sensor, and determine the load of the conveyor based on the second signal. The controller is further operable to determine an output of the mining system based on the position of the shearer and the load of the conveyor and control a speed of the shearer based on based on the output of the mining system.

In another embodiment, the invention provides a method of controlling an output of a mining system. The method includes receiving, at a processor, a first signal associated with a position of the shearer, determining, using the processor, the position of the shearer based on the first signal, receiving, at the processor, a second signal associated with a load of a conveyor, and determining, using the processor, the load of the conveyor based on the second signal. The method further includes determining, using the processor, an output of the mining system based on the position of the shearer and the load of the conveyor and controlling a speed of the shearer based on the output of the mining system.

In another embodiment, the invention provides a mining system. The mining system includes a shearer, a conveyor, a first drive mechanism coupled to the conveyor, a first sensor, a second sensor, and a controller. The first drive mechanism is operable to drive the conveyor. The first sensor is operable to generate a first signal related to a position of the shearer. The second sensor is operable to generate a second signal related to a load of the conveyor. The controller is operable to receive the first signal from the first sensor, determine the position of the shearer based on the first signal, receive the second signal from the second sensor, and determine the load of the conveyor based on the second signal. The controller is further operable to determine an output of the mining system based on the position of the shearer and the load of the conveyor and control a speed of the conveyor based on the output of the mining system.

In another embodiment, the invention provides a method of controlling an output of a mining system. The method includes receiving, at a processor, a first signal associated with a position of a shearer, determining, using the processor, the position of the shearer based on the first signal, receiving, at the processor, a second signal associated with a load of the conveyor, and determining, using the processor, the load of the conveyor based on the second signal. The method further includes determining, using the processor, an output of the mining system based on the position of the shearer and the load of the conveyor and controlling a speed of the conveyor based on the output of the mining system.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Other aspects of the invention will become apparent by consideration of the detailed description and accompanying drawings.

DETAILED DESCRIPTION

The invention described herein relates to the control of a longwall mining system. The longwall mining system includes, for example, longwall shearers, a conveyor, such as an armored face conveyor ("AFC") or beam stage loaders ("BSL"), and a controller. The controller is operable to receive one or more signals related to a characteristic of the longwall mining system (e.g., a position of the shearer, a load of the conveyor, etc.) and determine an output of the mining system based on the characteristics. The controller is further operable to control the speed of the shearer and/or the speed of the conveyor based on the output of the mining system. The speed of the shearer and/or the conveyor can be adjusted or modified to increase the productivity of the mining system without overloading the conveyor or over taxing the shearer. For descriptive purposes, the invention is described herein generally with respect to conveyors.

Figure 1:
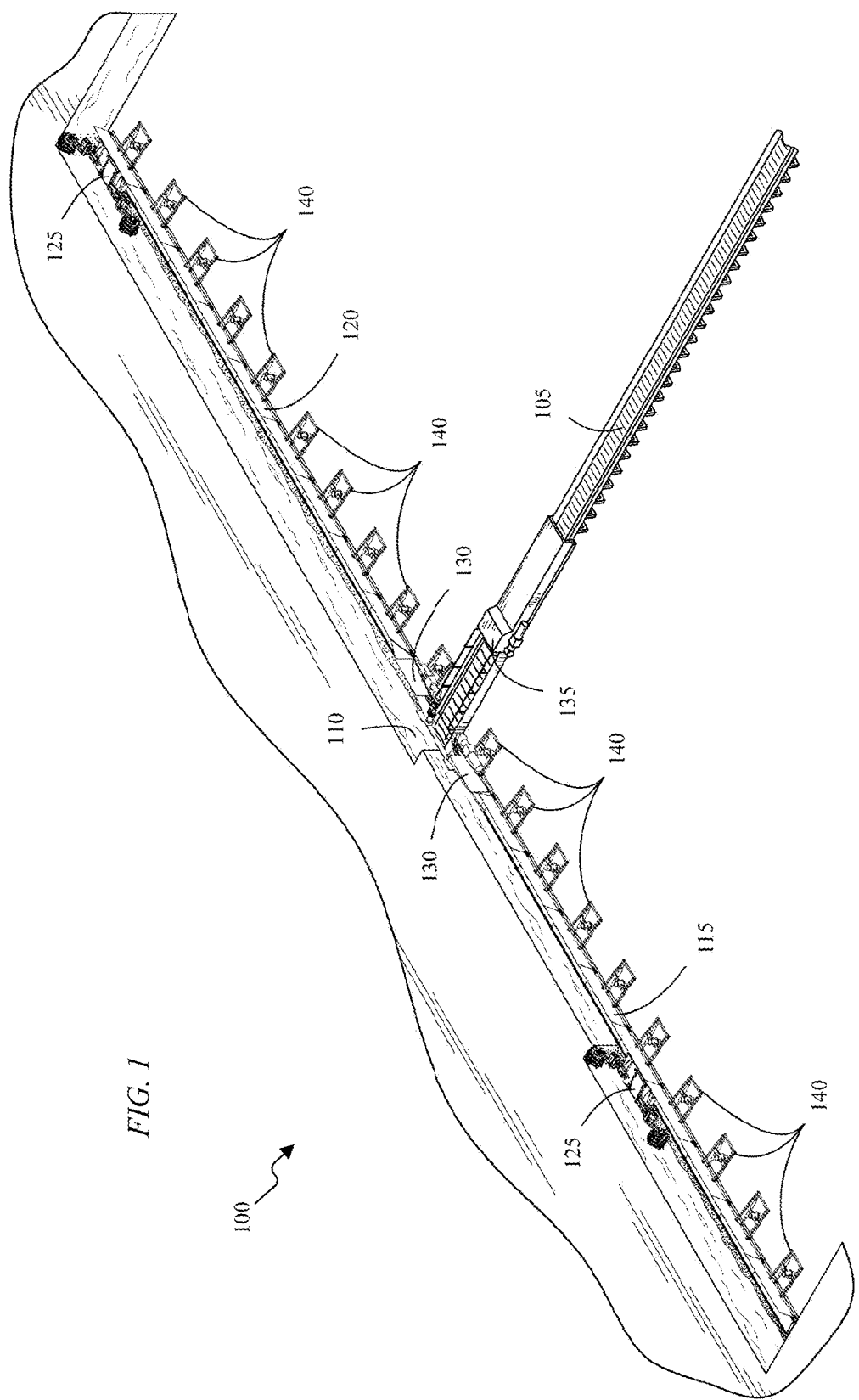
FIG. 1 is a perspective view of a longwall mining system.

FIG. 1 illustrates a longwall mining system 100. The mining system 100 includes a discharge conveyor 105 extending away from a mining face 110. Two conveyors 115 and 120 extend along the mining face 110. Longwall shearers 125 are mounted on the conveyors 115 and 120 for movement in a lateral direction substantially parallel to the mining face 110. The conveyors 115 and 120 include a drive end defining a discharge portion 130 positioned adjacent the discharge conveyor 105. The discharge conveyor 105 includes a crusher 135 for reducing the size of the mined material for further processing and storage. Conveyor translation devices 140 are operable to move the conveyors 115 and 120 toward the mining face 110. In some embodiments, the longwall mining system 100 is used in an underground mining operation and further includes a plurality of powered roof supports (not shown).

Figure 2:
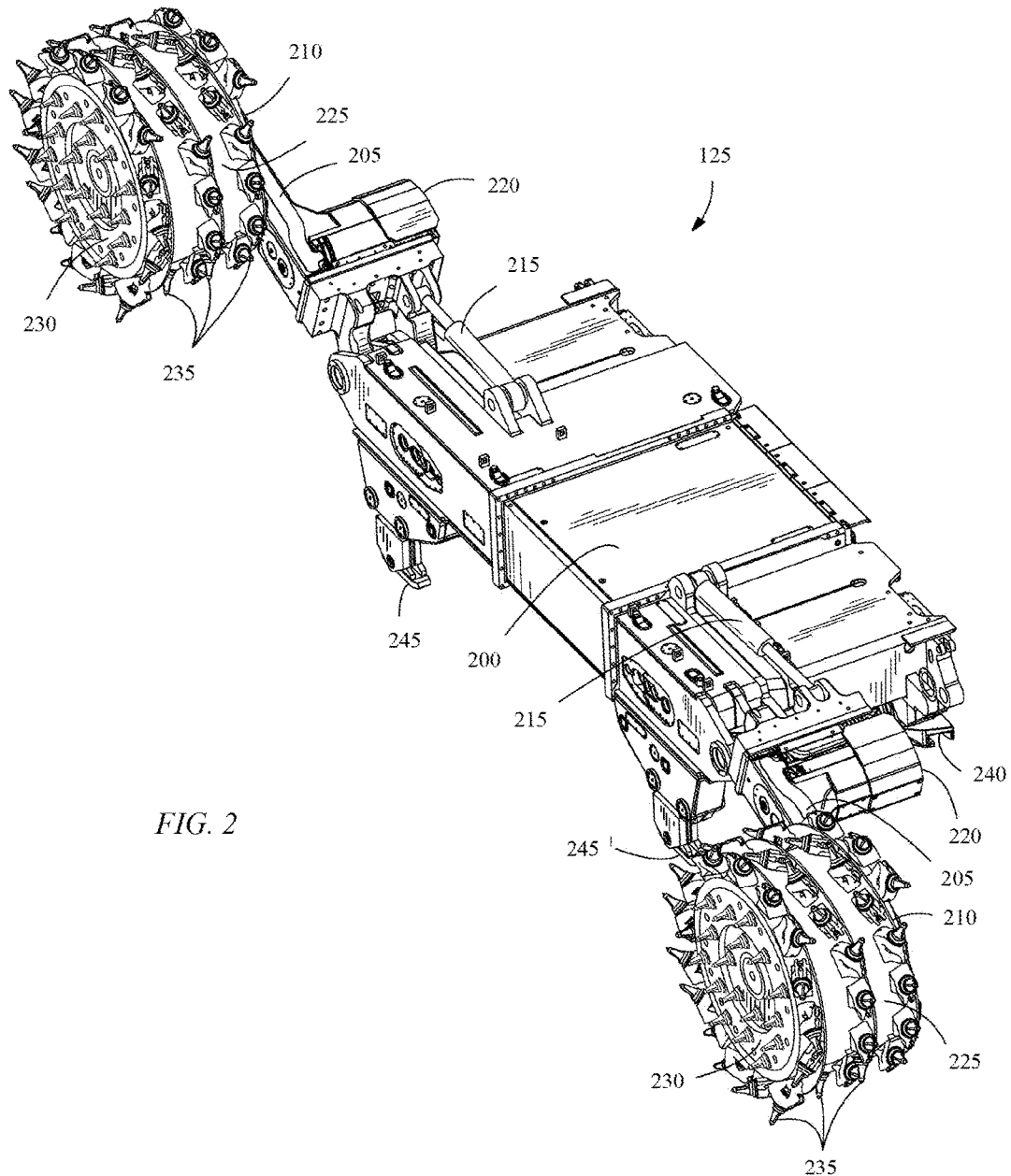
FIG. 2 is a perspective view of a longwall shearer associated with the mining system of FIG. 1.

As illustrated in FIG. 2, each longwall shearer 125 includes a generally rectangular chassis 200 and a pair of articulating arms 205, each of which supports a cutter assembly 210. The arms 205 are pivotally coupled to opposite ends of the chassis 200 and are pivoted by actuators 215 coupled between the arms 205 and the chassis 200. Each arm 205 supports a cutter motor 220 operable to rotatably drive cutter assembly 210. The cutter assembly 210 is generally cylindrical and includes a first cutting surface 225 for removing material from the mining face 110 when the longwall shearer 125 moves substantially parallel to the mining face 110, and a second cutting surface 230 defined by an end surface of the cutter assembly 210 for removing material from the mining face 110 when the longwall shearer 125 moves substantially normal to the mining face 110. The first cutting surface 225 may generally be cylindrical, and the second cutting surface 230 may be generally circular, annular, conical, or frusto-conical depending, among other things, on the type of material the cutting surfaces 225, 230 are intended to cut. Both the first and second cutting surfaces 225, 230 can be provided with a plurality of cutting teeth 235 of varying configurations for removing material from the mining face 110. In the illustrated embodiment, the teeth 235 are mounted on both the first and second cutting surfaces 225, 230.

The longwall shearer 125 also includes a pair of inboard support feet 240 and a pair of outboard support feet 245 (only one of the outboard support feet is visible in FIG. 2). The inboard and outboard support feet 240, 245 are configured or operable for mounting to the conveyors 115, 120 such that the longwall shearer 125 can move laterally along the conveyors 115, 120 from the discharge portion 130 to the return end of the conveyors 115, 120 and back again. The longwall shearer 125 is driven by a drive mechanism (e.g., a variable speed motor) along the conveyors 115, 120.

Figure 3:
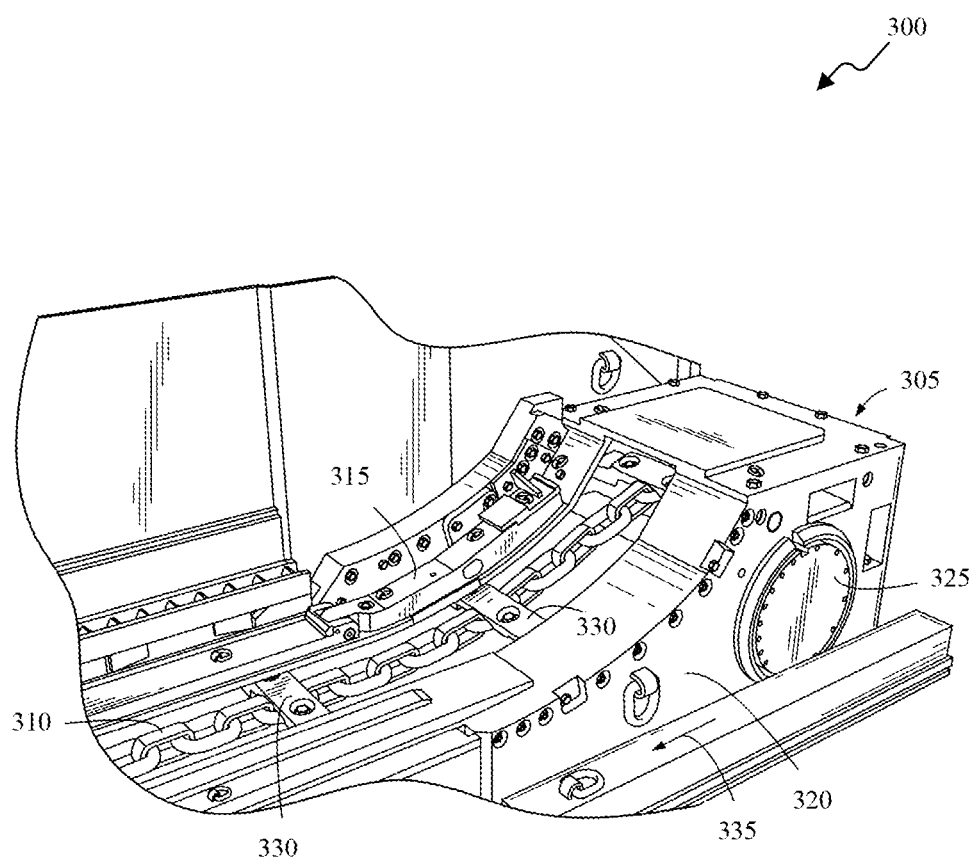
FIG. 3 is a perspective view of a portion of a conveyor associated with the mining system of FIG. 1.

FIG. 3 illustrates a portion of a longwall conveyor 300 similar to the conveyors 115, 120 of FIG. 1. The conveyor 300 includes a return end 305, a conveying element or chain 310 that travels between the return end 305 and the discharge portion 130 (see FIG. 1), and a sensor assembly 315 proximate to the return end 305. The chain 310 is driven by a drive mechanism, such as a variable speed motor, associated with the discharge portion 130. The return end 305 includes a frame 320, a sprocket or take-up shaft 325 mounted on the frame 320, and at least one hydraulic cylinder (not shown). The frame 320 moves with respect to the discharge portion 130 based on the extension and retraction of the hydraulic cylinder. The chain 310 passes around the take-up shaft 325 to travel in a continuous loop between the discharge portion 130 and the return end 305. The chain 310 includes a plurality of flight members 330 mounted on the chain 310 and spaced apart by a first distance in a direction of travel 335 of the chain 310.

Figure 4:
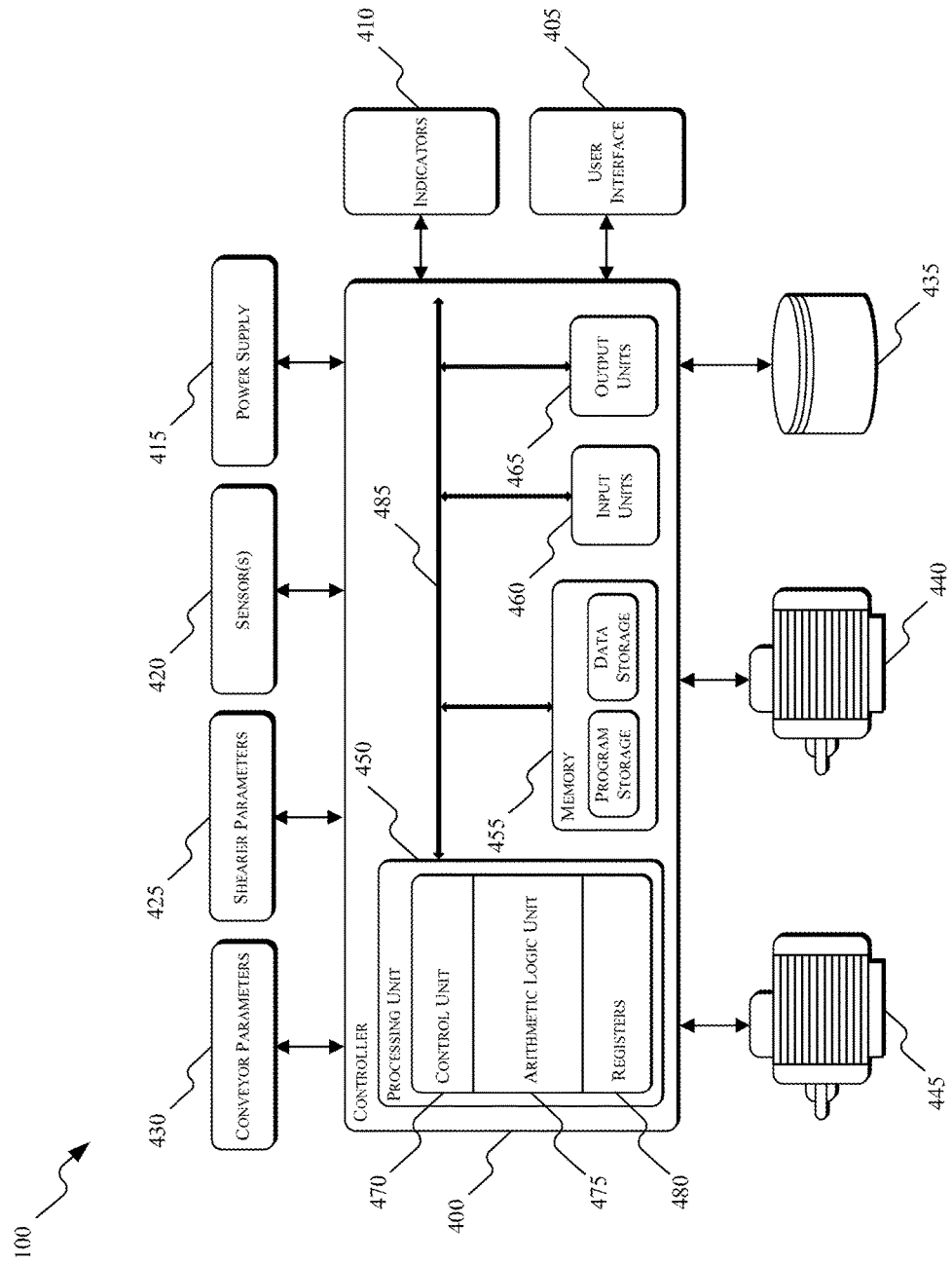
FIG. 4 illustrates a controller for the mining system of FIG. 1 according to an embodiment of the invention.

FIG. 4 illustrates a controller 400 associated with the mining system 100. The controller 400 is connected or coupled to a variety of additional modules or components, such as a user interface module 405, one or more indicators 410, a power supply module 415, one or more sensors 420, a shearer parameters module 425, a conveyor parameters module 430, a data store or database 435, a first drive mechanism and drive 440 (e.g., associated with one or more shearers 125), and a second drive mechanism and drive 445 (e.g., associated with one or more conveyors 300). In some embodiments, the first drive mechanism and drive 440 includes a first motor and a first motor drive, and the second drive mechanism and drive 445 includes a second motor and second motor drive. In some embodiments, a first motor and first motor drive 440 and the second motor and second motor drive 445 each include switchgear assemblies. Embodiments of the invention described herein are described with respect to the drive mechanisms and drives being motors and motor drives.

The one or more sensors 420 are, for example, sensors configured or operable to measure or sense a characteristic of the shearer 125 (e.g., a shearer position, a shearer speed, etc.), sensors configured or operable to measure or sense a characteristic of the conveyor 300 (e.g., a chain position, a chain speed, a chain tension, etc.), power transducers within the longwall mining system 100 configured or operable to measure or sense an electrical characteristic (e.g., current, voltage, power factor, torque, speed, input power, output power, etc.), load cells or sensors (e.g., tension sensors, load pins, etc.) operable to generate a signal related to a load of the conveyor, etc. In some embodiments, the conveyor includes a plurality of load sensor assemblies at different locations on the conveyor for generating a plurality of signals related to the load of the conveyor. The load of the conveyor can then be determined based on a sum or average of the measurements from the load sensor assemblies. In some embodiments, the sensor assemblies are similar to those disclosed in U.S. Pat. No. 8,931,628, entitled "AUTOMATED FACE CONVEYOR CHAIN TENSION LOAD SENSOR IN CHAIN TENSION PLATE," the entire content of which is hereby incorporated by reference. In other embodiments, the sensor assemblies are similar to those disclosed in U.S. Pat. No. 8,636,140, entitled "CHAIN TENSION SENSOR," the entire content of which is also hereby incorporated by reference.

The controller 400 includes combinations of hardware and software that are operable to, among other things, determine an output of the mining system 100, control the operation of the mining system 100, activate the one or more indicators 410 (e.g., a liquid crystal display ["LCD"]), monitor the operation of the mining system 100, etc. In some embodiments, the controller 400 includes a plurality of electrical and electronic components that provide power, operational control, and protection to the components and modules within the controller 400 and/or the mining system 100. For example, the controller 400 includes, among other things, a processing unit 450 (e.g., a microprocessor, a microcontroller, or another suitable programmable device), a memory 455, input units 460, and output units 465. The processing unit 450 includes, among other things, a control unit 470, an arithmetic logic unit ("ALU") 475, and a plurality of registers 480 (shown as a group of registers in FIG. 4), and is implemented using a known computer architecture, such as a modified Harvard architecture, a von Neumann architecture, etc. The processing unit 450, the memory 455, the input units 460, and the output units 465, as well as the various modules connected to the controller 400 are connected by one or more control and/or data buses (e.g., common bus 485). The control and/or data buses are shown generally in FIG. 4 for illustrative purposes. The use of one or more control and/or data buses for the interconnection between and communication among the various modules and components would be known to a person skilled in the art in view of the invention described herein. In some embodiments, the controller 400 is implemented partially or entirely on a semiconductor chip, is a field-programmable gate array ("FPGA"), is an application specific integrated circuit ("ASIC"), etc.

The memory 455 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or data structures. The processing unit 450 is connected to the memory 455 and executes software instructions that are capable of being stored in a RAM of the memory 455 (e.g., during execution), a ROM of the memory 455 (e.g., on a generally permanent basis), or another non-transitory computer readable medium such as another memory or a disc. Software included in the implementation of the mining system 100 can be stored in the memory 455 of the controller 400. The software includes, for example, firmware, one or more applications, program data, filters, rules, one or more program modules, and other executable instructions. The controller 400 is configured or operable to retrieve from memory and execute, among other things, instructions related to the control processes and methods described herein. In other constructions, the controller 400 includes additional, fewer, or different components.

The shearer parameters module 425 is connected to or associated with one or more shearers 125 that are driven by the first drive mechanism and drive 440. The shearer parameters module 425 is configured or operable to receive signals associated with one or more parameters (e.g., shearer position, shearer speed, motor speed, motor current, motor voltage, input power, etc.) of the one or more shearers 125. In some embodiments, the shearer parameters module 425 generates signals related to the shearer parameters. In other embodiments, the shearer parameters module 425 includes or is connected to the one or more sensors 420 and receives signals from the one or more sensors 420 related to the shearer parameters.

The conveyor parameters module 430 is connected to or associated with one or more conveyors 300 that are driven by the second drive mechanism and drive 445. The conveyor parameters module 430 is configured or operable to receive signals associated with one or more parameters of the conveyor (e.g., conveyor load or loading, conveyor speed, motor speed, motor current, motor voltage, input power, etc.). In some embodiments, the conveyor parameters module 430 generates signals related to the conveyor parameters. In other embodiments, the conveyor parameters module 430 includes or is connected to the one or more sensors 420 and receives signals from the one or more sensors 420 related to the conveyor parameters.

The motors 440, 445 are controlled by control signals received from the controller 400 or another associated controller. The motors 440, 445 are also coupled to gear reduction boxes to reduce the rotational speed of the motors 440, 445 to a rotational speed appropriate for the shearer 125 and the conveyor. In some implementations, the controller 400 is configured or operable to control the motors 440, 445 and the mining system 100 autonomously using the sensors 420 and one or more stored programs or modules. In other implementations, the controller 400 is configured or operable to control the motors 440, 445 and the mining system 100 based on a combination of manual inputs and automatic controls.

The user interface module 405 is used to control or monitor the shearer 125, the conveyor 300, and/or the mining system 100. For example, the user interface module 405 is operably coupled to the controller 400 to control the speed of the shearer 125, the speed of the conveyor 300, the speed of the motors 440, 445, etc. The user interface module 405 can include a combination of digital and analog input or output devices required to achieve a desired level of control and monitoring for the mining system 100. For example, the user interface module 405 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMOLED") display. The user interface module 405 can also be configured or operable to display conditions or data associated with the mining system 100 in real-time or substantially real-time. For example, the user interface module 405 is configured or operable to display measured characteristics of the mining system 100 (e.g., of the shearer 125, the conveyor 300, etc.), the status of the mining system 100, fault conditions (e.g., slack chain, zero tension chain, etc.), an amount of mined material on the conveyor 300, etc. In some implementations, the user interface module 405 is controlled in conjunction with the one or more indicators 410 (e.g., LEDs) to provide visual indications of the status or conditions of the mining system 100.

Although a single controller is illustrated in FIG. 4, in other constructions, the controller 400 may be separated into a plurality of controllers. For example, the controller 400 may be separated into a consolidated control unit ("CCU"), a programmable control unit ("PCU"), etc. The CCU can be housed in an explosion-proof enclosure and provides control over the conveyor system. The PCU is an intrinsically safe system that can be interfaced with the CCU for, among other things, stopping, inhibiting, tripping, etc., the operation of the conveyor.

As previously indicated, in some embodiments, the controller 400 is configured or operable to control the speed of the one or more shearers 125 based on whether the mining system 100 is being fully (e.g., close to 100%) utilized. The controller 400 is also configured or operable to receive signals from the one or more sensors 420 associated with the motors 440, 445, the shearer 125, the conveyor 300, or other components of the mining system 100. The signals from the sensors 420 are related to, for example, a position of the shearer 125, a load of the conveyor 300, etc. The controller 400 then processes and analyzes the signals to determine an output of the mining system 100. The output of the mining system is a measure of the productivity of the longwall mining system 10, and may be measured in units of tons (i.e., of mined material) per unit time (e.g., minutes, hours, etc.). The output of the mining system is dependent upon, among other things, an amount of mined material removed from the mining face 110 by the shearers 125, the amount of mined material loaded on the conveyor 300, and a speed of the shearer 125. In some embodiments, the controller 400 determines whether the output of the mining system 100 is optimized by comparing the output of the mining system to a predetermined threshold, such as a maximum output possible for the mining system 100. The predetermined threshold is, for example, between 90% and 100% of the maximum (safe) output of the mining system 100 (e.g., an output that will not overload the conveyor 300 or over tax the shearers 125). The controller 400 then controls the speed of the shearer 125 based on the comparison of the output to the threshold. In some embodiments, the controller 400 controls the speed of the shearer 125 based on a function related to the output of the mining system 100. In other embodiments, the controller 400 controls the speed of the shearer 125 based on a value in a look-up table related to the output of the mining system 100. The speed of the shearer can be a speed at which the shearer is moved along the conveyor 300 and/or a speed at which the cutter assemblies 210 are rotated.

Additionally or alternatively, the controller 400 is configured or operable to control the speed of the one or more conveyors 300 based on whether the mining system 100 is being fully (e.g., close to 100%) utilized. The controller 400 is also configured or operable to receive signals from the one or more sensors 420 associated with the motors 440, 445, the shearer 125, the conveyor 300, or other components of the mining system 100. The signals from the sensors 420 are related to, for example, a position of the shearer 125, a load of the conveyor 300, etc. The controller 400 then processes and analyzes the signals to determine an output of the mining system 100. The output of the mining system 100 is a measure of the productivity of the mining system 100, and may be measured in units of tons (i.e., of mined material) per unit time (e.g., minutes, hours, etc.). The output of the mining system is dependent upon, among other things, an amount of mined material removed from the mining face 110 by the shearer 125, the amount of mined material loaded on the conveyor 300, and the speed of the shearer 125. In some embodiments, the controller 400 determines whether the output of the mining system 100 is optimized by comparing the output of the mining system to a predetermined threshold, such as a maximum output possible for the mining system 100. The predetermined threshold is, for example, between 90% and 100% of the maximum (safe) output of the mining system 100 (e.g., an output that will not overload the conveyor 300 or over tax the shearers 125). The controller 400 then controls the speed of the conveyor 300 based on the comparison of the output to the threshold. In some embodiments, the controller 400 controls the speed of the conveyor 300 based on a function related to the output of the mining system 100. In other embodiments, the controller 400 controls the speed of the conveyor 300 based on a value in a look-up table related to the output of the mining system 100.

The output of the mining system 100 is a measure of the productivity of the mining system 100. During operation, the output of the mining system 100 is preferably as close to the maximum output possible for the mining system 100 based on the mined material, mining conditions, system configuration, etc. The output of the mining system 100 at any given time can be expressed as a percentage (%) of a maximum output of the mining system 100. As such, the longwall mining system is most productive and the most utilized when the output of the mining system 100 is approximately 100% of the maximum output (e.g., between 90% and 100%). If the output of the mining system is less than the maximum output, the controller 400 adjusts (e.g., increases) the speed of the shearer 125 and/or the conveyor 300 to increase the output of the mining system 100.

Figure 5:
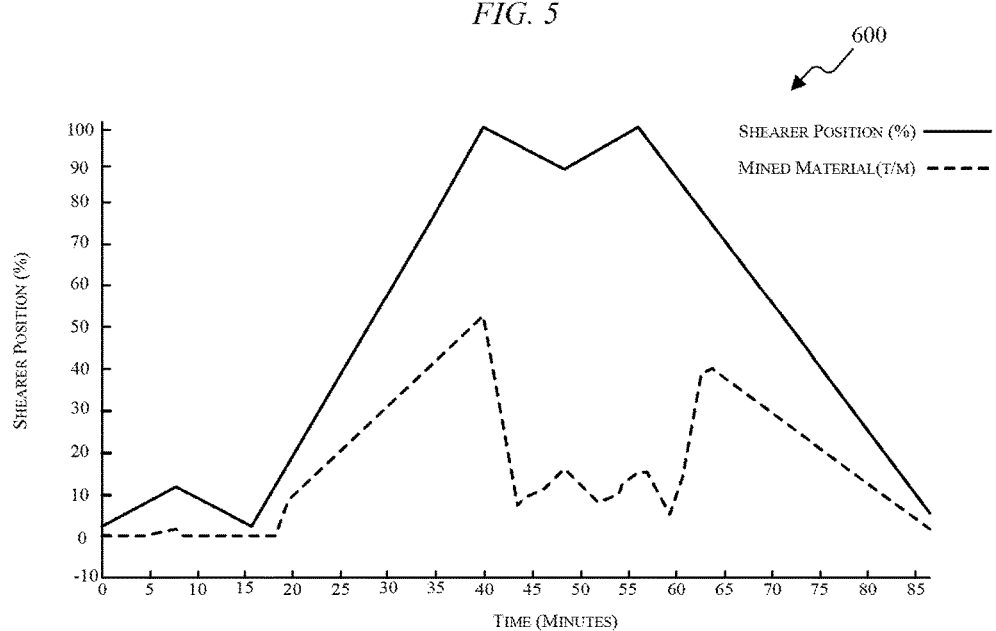
FIG. 5 is a diagram illustrating a relationship between a position of the shearer of FIG. 2 and an amount of mined material loaded on the conveyor of FIG. 3.
Figure 6:
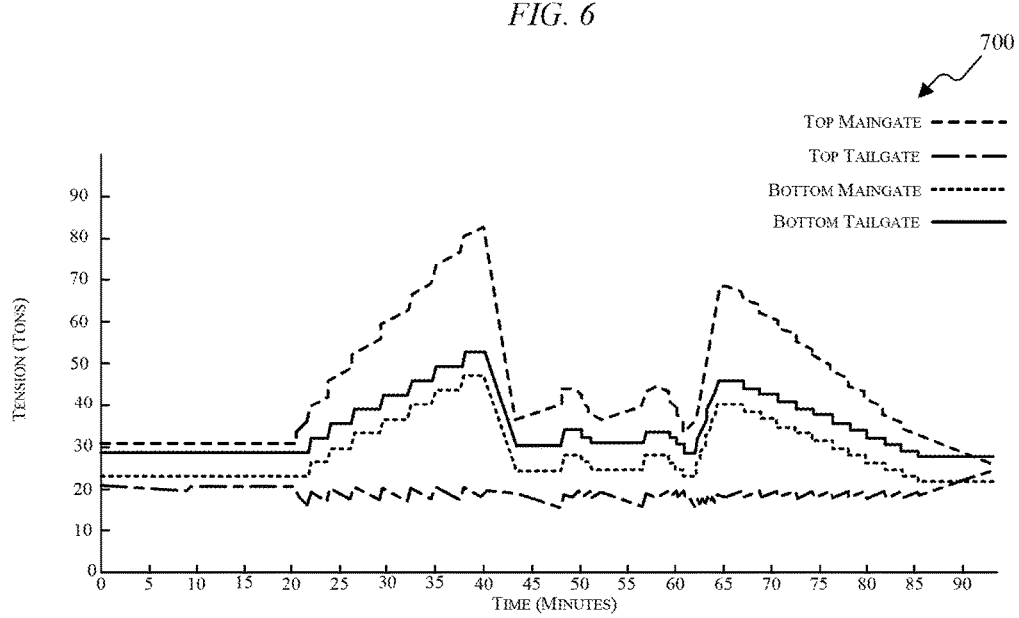
FIG. 6 is a diagram illustrating a manner in which chain tension varies along the length of the conveyor of FIG. 3.

The output of the mining system 100 is determined based on the position of the shearer 125 and/or the load (e.g., of mined material, power consumption, etc.) on the conveyor 300. FIGS. 5 and 6 illustrate the relationship between the position of the shearer 125 and an amount of mined material on the conveyor 300, and the tension in the conveyor chain 310 (which is related to the load of the conveyor, power consumption of the conveyor, etc.). Specifically, FIG. 5 is a diagram 600 that illustrates a relationship between the position of the shearer 125 and the amount of mined material loaded on a conveyor 300 (i.e., in tons per meter ["t/m"]), and is illustrated with time (i.e., minutes) along an x-axis of a coordinate system. The position of the shearer 125 is depicted with respect to a percentage (%) of the mining face 110 (i.e., between a maingate and a tailgate of the mining face 110). For example, if the shearer 125 is located at an extreme far end of a mining system 100 (e.g., tailgate), the percentage of the shearer's position is 100% (i.e., with respect to the full range of motion of the shearer 125 along the mining face 110). As the position of the shearer 125 approaches the 100% position, the amount of mined material that is loaded on the conveyor 300 also increases in relation to the position of the shearer 125. Therefore, the output of the mining system 100 is related to the position of the shearer 125 along the mining face 110, and the position of the shearer can be used to determine and/or predict the output of the mining system 100.

Similarly, FIG. 6 is a diagram 700 of the tensions (i.e., in tons) at various locations of the chain 310 with respect to time. For example, the diagram 700 includes the top maingate tension, the top tailgate tension, the bottom maingate tension, and the bottom tailgate tension. The tensions are given in tons and are also related to the position of the shearer 125 and the loading of the conveyor 300 (e.g., the amount of mined material loaded on the conveyor 300). With comparison to FIG. 5, as the amount of mined material loaded on the conveyor 300 increases, the tension in the chain 310 increases. Similarly, as the position of the shearer 125 increases, the tension in the chain 310 increases. In some embodiments, the aggregate tension in the chain 310, the average tension in the chain 310, and/or the tension in the chain 310 at a specific location is used to determine or calculate the load of the conveyor 300. In other embodiments, the aggregate tension in the chain 310, the average tension in the chain 310, and/or the tension in the chain 310 at a specific location is considered to be representative of the load of the conveyor 300. The load of the conveyor 300 and/or the position of the shearer 125 can, therefore, be used to determine the output of the mining system 100.

The process 800, 900, and 1000 are associated with and described herein with respect to determining the output of the mining system 100 and controlling the speed of the shearer 125 and/or the conveyor 300 based on the output of the mining system. Various steps described herein with respect to the processes 800, 900, and 1000 are capable of being executed simultaneously, in parallel, or in an order that differs from the illustrated serial manner of execution. The processes 800, 900, and 1000 may also be capable of being executed using fewer steps than are shown in the illustrated embodiment. Additionally, the controller 400 is operable to execute the process 800, 900, and 1000 at the same time or in tandem with other processes.

Figure 7:
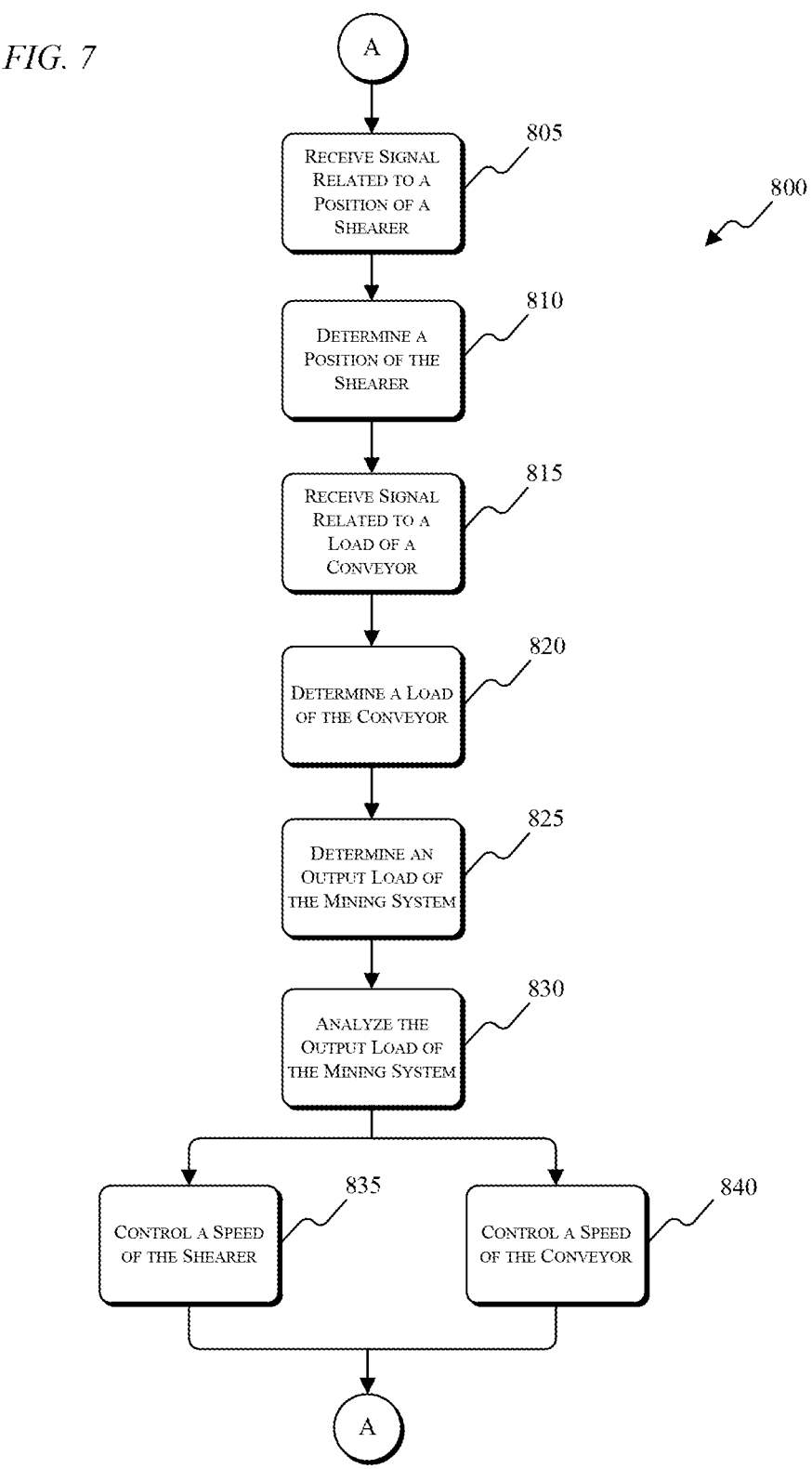
FIG. 7 is a process for optimizing the mining system of FIG. 1

FIG. 7 illustrates a process 800 for controlling the mining system 100. At step 805, the controller 400 receives a first signal related to a position of the shearer 125. The controller 400 is configured or operable to determine or calculate a value for the position of the shearer 125, for example, as a percentage (%) of position along the mining face 110 (step 810). At step 815, the controller 400 receives a second signal related to a load of the conveyor 300. The controller 400 is configured or operable to determine or calculate a value for the load of the conveyor 300, for example, in units of tons per meter (step 820).

At step 825, the controller 400 determines or calculates an output of the mining system 100 based on the characteristics determined in step 810 (i.e., the position of the shearer 125) and step 820 (i.e., the load of the conveyor 300). The output of the mining system 100 can be calculated, for example, by determining how many tons of mined material the shearer 125 removes during a lateral movement along the mining face 110, how many tons of mined material the conveyor 300 is moving towards the discharge portion 130 in a unit time (e.g., minutes, hours, etc.), etc. At step 830, the controller 400 analyzes the output of the mining system 100. In one embodiment, the controller 400 is configured or operable to compare the output of the mining system to a predetermined threshold. The predetermined threshold is, for example, the maximum output of the mining system 100. As described above, the output of the mining system 100 can be described as a percentage (%) of the maximum output of the mining system 100. Additionally or alternatively, the controller 400 can analyze the output of the mining system 100 using a function and/or look-up table related to the output of the mining system 100 (e.g., the present output of the mining system is an input to a function or a look-up table and the function or look-up table produces necessary control signals or parameters). Based on the analysis of the output of the mining system 100, the controller 400 is configured or operable to control the speed of the shearer 125 (step 835) and the speed of the conveyor 300 (step 840). For example, the controller 400 can increase the speed of the motor 440 driving the shearer 125 in order to increase the amount of mined material removed from the mining face 110. The controller 400 can also increase the speed of the motor 445 driving the conveyor 300 in order to increase the speed of the conveyor 300 and the amount of mined material that is conveyed from the mining face 110. The process 800 can be performed continuously during the operation of the mining system 100 to constantly adjust or modify the speed of the shearer 125 and the conveyor 300 in order to maximize the productivity of the mining system 100. In some embodiments, the output of the mining system 100 is not determined and the position of the shearer 125 and the load of the conveyor 300 are used to directly control the speed of the shearer 125 and the conveyor 300.

Figure 8:
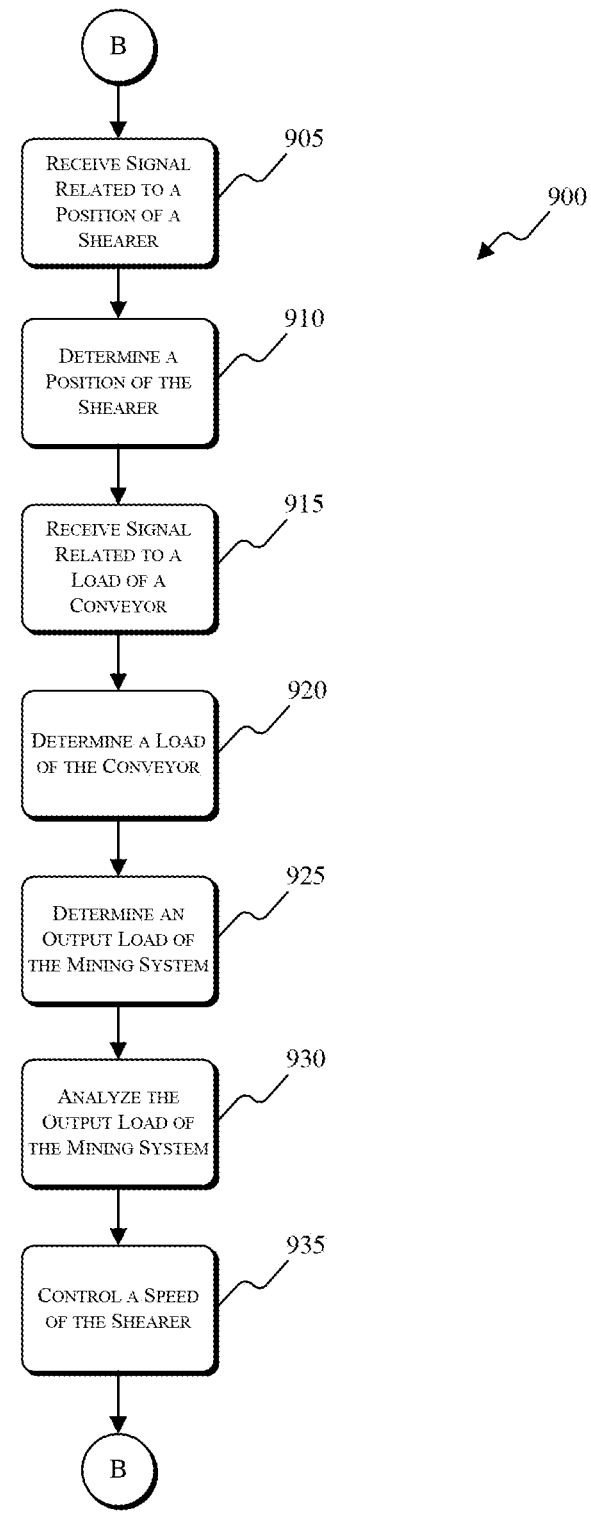
FIG. 8 is another process for optimizing the mining system of FIG. 1.

FIG. 8 illustrates a process 900 for controlling the mining system 100. At step 905, the controller 400 receives a first signal related to a position of the shearer 125. The controller 400 is configured or operable to determine or calculate a value for the position of the shearer 125, for example, as a percentage (%) of position along the mining face 110 (step 910). At step 915, the controller 400 receives a second signal related to a load of the conveyor 300. The controller 400 is configured or operable to determine or calculate a value for the load of the conveyor 300, for example, in units of tons per meter (step 920).

At step 925, the controller 400 determines or calculates an output of the mining system 100 based on the characteristics determined in step 910 (i.e., the position of the shearer 125) and step 920 (i.e., the load of the conveyor 300). The output of the mining system 100 can be calculated, for example, by determining how many tons of mined material the shearer 125 removes during a lateral movement along the mining face 110, how many tons of mined material the conveyor 300 is moving towards the discharge portion 130 in a unit time (e.g., minutes, hours, etc.), etc. At step 930, the controller 400 analyzes the output of the mining system 100. In one embodiment, the controller 400 is configured or operable to compare the output of the mining system to a predetermined threshold. The predetermined threshold is, for example, the maximum output of the mining system 100. As described above, the output of the mining system 100 can be described as a percentage (%) of the maximum output of the mining system 100. Additionally or alternatively, the controller 400 can analyze the output of the mining system 100 using a function and/or look-up table related to the output of the mining system 100 (e.g., the present output of the mining system is an input to a function or a look-up table and the function or look-up table produces necessary control signals or parameters). Based on the analysis of the output of the mining system 100, the controller 400 is configured or operable to control the speed of the shearer 125 (step 935). For example, the controller 400 can increase the speed of the motor 440 driving the shearer 125 in order to increase the amount of mined material removed from the mining face 110. The process 900 can be performed continuously during the operation of the mining system 100 to constantly adjust or modify the speed of the shearer 125 and the conveyor 300 in order to maximize the productivity of the mining system 100. In some embodiments, the output of the mining system 100 is not determined and the position of the shearer 125 and the load of the conveyor 300 are used to directly control the speed of the shearer 125 and the conveyor 300.

Figure 9:
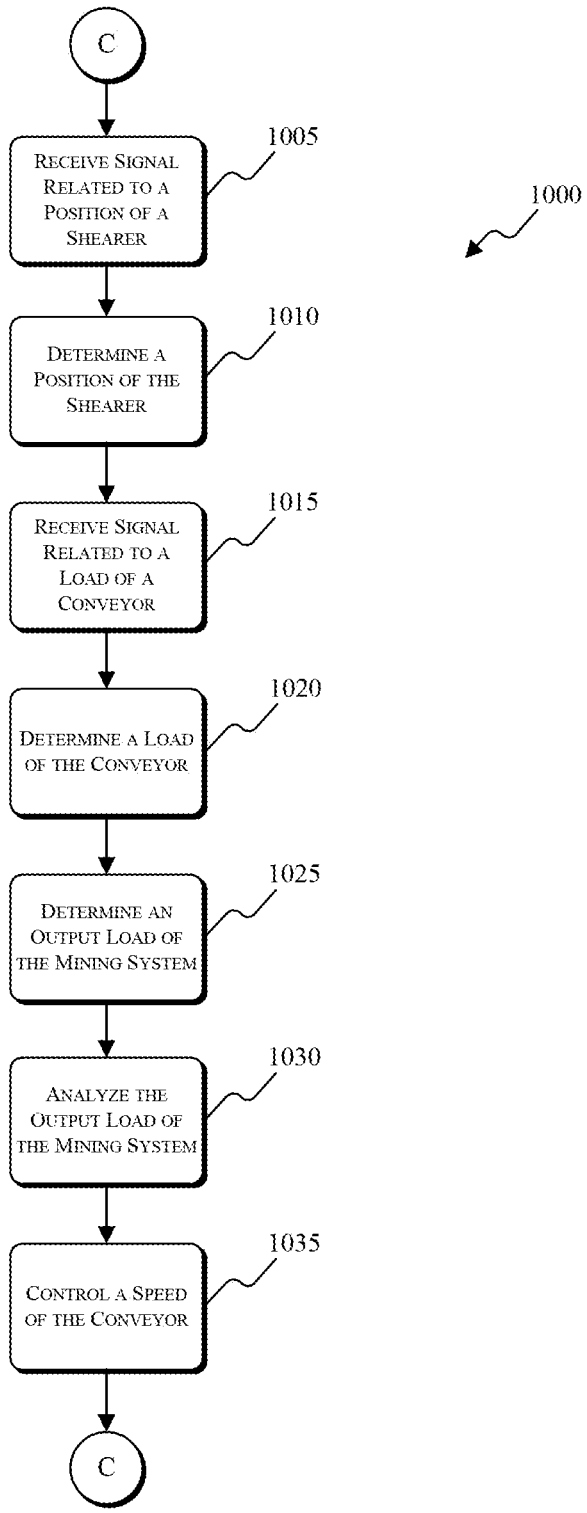
FIG. 9 is another process for optimizing the mining system of FIG. 1.

FIG. 9 illustrates a process 1000 for controlling the mining system 100. At step 1005, the controller 400 receives a first signal related to a position of the shearer 125. The controller 400 is configured or operable to determine or calculate a value for the position of the shearer 125, for example, as a percentage (%) of position along the mining face 110 (step 1010). At step 1015, the controller 400 receives a second signal related to a load of the conveyor 300. The controller 400 is configured or operable to determine or calculate a value for the load of the conveyor 300, for example, in units of tons per meter (step 1020).

At step 1025, the controller 400 determines or calculates an output of the mining system 100 based on the characteristics determined in step 1010 (i.e., the position of the shearer 125) and step 1020 (i.e., the load of the conveyor 300). The output of the mining system 100 can be calculated, for example, by determining how many tons of mined material the shearer 125 removes during a lateral movement along the mining face 110, how many tons of mined material the conveyor 300 is moving towards the discharge portion 130 in a unit time (e.g., minutes, hours, etc.), etc. At step 1030, the controller 400 analyzes the output of the mining system 100. In one embodiment, the controller 400 is configured or operable to compare the output of the mining system to a predetermined threshold. The predetermined threshold is, for example, the maximum output of the mining system 100. As described above, the output of the mining system 100 can be described as a percentage (%) of the maximum output of the mining system 100. Additionally or alternatively, the controller 400 can analyze the output of the mining system 100 using a function and/or look-up table related to the output of the mining system 100 (e.g., the present output of the mining system is an input to a function or a look-up table and the function or look-up table produces necessary control signals or parameters). Based on the analysis of the output of the mining system 100, the controller 400 is configured or operable to control the speed of the conveyor 300 (step 1035). For example, the controller 400 can increase the speed of the motor 445 driving the conveyor 300 in order to increase the speed of the conveyor 300 and the amount of mined material that is conveyed from the mining face 110. The process 1000 can be performed continuously during the operation of the mining system 100 to constantly adjust or modify the speed of the shearer 125 and the conveyor 300 in order to maximize the productivity of the mining system 100. In some embodiments, the output of the mining system 100 is not determined and the position of the shearer 125 and the load of the conveyor 300 are used to directly control the speed of the shearer 125 and the conveyor 300.

In some embodiments, the controller 400 is also configured or operable to selectively enable or disable additional features or controls of the mining system 100, such as bank push, snake loading, double snake, auto-drag, multiple advance, slewing the face, etc., based on the loading of the conveyor 300 and/or the output of the mining system 100.

For example, as the shearer 125 advances along the mining face 110, the conveyor 300 is advanced toward the mining face 110 to be ready for the next pass of the shearer 125. The power associated with advancing the conveyor 300 in such a manner accounts for approximately 20% of the loading of the conveyor 300. As a result of the increased loading from advancing the conveyor 300, there is less loading available for the transport of mined material along the conveyor 300. There are, however, natural reductions in the amount of loading on the conveyor 300 from mined material (see FIG. 5). For example, when the shearer 125 reaches the end of the mining face, the shearer must change directions and perform other operations that allow the mined material on the conveyor 300 to be conveyed away without being replaced as quickly, thus reducing the loading on the conveyor 300 from mined material. As such, in order to increase the output of the mining system 100, the controller 400 can slow or inhibit the advance of the conveyor (e.g., reduce the advance speed of the conveyor, prevent the conveyor from advancing [i.e., reduce advance speed to zero], etc.) during normal operation (e.g., not at an end of the mining face 110, between 10% and 90% of the length of the mining face 110, between 20% and 80% of the mining face 110, etc.). As a result, there is additional conveyor loading that is available that can be used to increase the speed of the shearer 125 and/or speed of the conveyor 300. As the shearer 125 approaches an end of the mining face 110 and the loading on the conveyor 300 from the mined material is reduced, the controller 400 can allow the conveyor 300 to advance toward the mining face 110 (e.g., increase the advance speed of the conveyor).

Thus, the invention may generally provide, among other things, systems and methods for controlling a speed a shearer and/or a conveyor in a mining system based on an output of the mining system.

What is claimed is:

1. A computer implemented method for controlling operation of a mining system, the mining system including a shearer and a conveyor, the method comprising:
   determining, using a processor, a position of the shearer based on a first signal from a first sensor, the first signal associated with the position of the shearer;
   determining, using the processor, a load of the conveyor based on a second signal from a second sensor, the second signal associated with the load of the conveyor;
   determining, using the processor, an output of the mining system based on the determined position of the shearer and the determined load of the conveyor;

generating, using the processor, a first control signal for a first drive mechanism to control a speed of the shearer based on the determined output of the mining system; and generating, using the processor, a second control signal for a second drive mechanism to control a speed of the conveyor based on the determined output of the mining system.

2. The computer implemented method of claim 1, further comprising comparing, using the processor, the output of the mining system to a predetermined threshold, and controlling the speed of the shearer based on the comparison of the output to the predetermined threshold.

3. The computer implemented method of claim 2, wherein the predetermined threshold is a maximum output of the mining system.

4. The computer implemented method of claim 1, wherein the first sensor is a position sensor.

5. The computer implemented method of claim 1, wherein the second sensor is a load sensor.

6. The computer implemented method of claim 5, wherein the load sensor is a tension sensor.

7. The computer implemented method of claim 1, wherein the first drive mechanism includes a first variable speed motor, and the second drive mechanism includes a second variable speed motor.

8. The computer implemented method of claim 1, wherein the speed of the conveyor is a speed of conveyor advance toward a mining face.

9. A controller for a mining system that includes a shearer and a conveyor, the controller including a non-transitory computer readable medium and a processor, the controller comprising computer executable instructions stored in the computer readable medium for controlling operation of the mining system to:

determine a position of the shearer based on a first signal received from a first sensor, the first signal associated with the position of the shearer;

determine a load of the conveyor based on a second signal received from a second sensor, the second signal associated with the load of the conveyor;

determine an output of the mining system based on the determined position of the shearer and the determined load of the conveyor;

generate a first control signal for a first drive mechanism to control a speed of the shearer based on the determined output of the mining system; and generate a second control signal for a second drive mechanism to control a speed of the conveyor based on the determined output of the mining system.

10. The controller of claim 9, further comprising computer executable instructions stored in the computer readable medium to:

compare the output of the mining system to a predetermined threshold; and control the speed of the shearer based on the comparison of the output to the predetermined threshold.

11. The controller of claim 10, wherein the predetermined threshold is a maximum output of the mining system.

12. The controller of claim 9, wherein the first sensor is a position sensor.

13. The controller of claim 9, wherein the second sensor is a load sensor.

14. The controller of claim 9, wherein the first drive mechanism includes a first variable speed motor, and the second drive mechanism includes a second variable speed motor.

15. The controller of claim 14, wherein the speed of the shearer is controlled by controlling a speed of the first variable speed motor, and the speed of the conveyor is controlled by controlling a speed of the second variable speed motor.

16. The controller of claim 9, wherein the speed of the conveyor is a speed of conveyor advance toward a mining face.

17. A controller for a mining system that includes a shearer and a conveyor, the controller including a non-transitory computer readable medium and a processor, the controller comprising computer executable instructions stored in the computer readable medium for controlling operation of the mining system to:

determine a position of the shearer based on a first signal from a first sensor, the first signal associated with the position of the shearer;

determine a load of the conveyor based on a second signal from a second sensor, the second signal associated with the load of the conveyor;

determine an output of the mining system based on the determined position of the shearer and the determined load of the conveyor; and generate a first control signal for a first drive mechanism to control a speed of the shearer based on the determined output of the mining system.

18. The controller of claim 17, further comprising computer executable instructions stored in the computer readable medium to:

compare the output of the mining system to a predetermined threshold; and control the speed of the shearer based on the comparison of the output to the predetermined threshold.

19. The controller of claim 18, wherein the predetermined threshold is a maximum output of the mining system.

20. A controller for a mining system that includes a shearer and a conveyor, the controller including a non-transitory computer readable medium and a processor, the controller comprising computer executable instructions stored in the computer readable medium for controlling operation of the mining system to:

determine a position of the shearer based on a first signal from a first sensor, the first signal associated with the position of the shearer;

determine a load of the conveyor based on a second signal from a second sensor, the second signal associated with the load of the conveyor;

determine an output of the mining system based on the determined position of the shearer and the determined load of the conveyor; and generate a first control signal for a first drive mechanism to control a speed of the conveyor based on the determined output of the mining system.

21. The controller of claim 20, further comprising computer executable instructions stored in the computer readable medium to:

compare the output of the mining system to a predetermined threshold; and control the speed of the conveyor based on the comparison of the output to the predetermined threshold.

22. The controller of claim 21, wherein the predetermined threshold is a maximum output of the mining system.

* * * * *